No. 760,691. PATENTED MAY 24, 1904.
B. P. HERNDON.
PROSPECTOR'S PAN.
APPLICATION FILED APR. 9, 1903.
NO MODEL.

Witnesses
Elmer Seavey
Geo. B. Lawton

Inventor
Beverly P. Herndon.
By Henry N. Copp.
Attorney

No. 760,691. Patented May 24, 1904.

UNITED STATES PATENT OFFICE.

BEVERLY P. HERNDON, OF FLORENCE, ARIZONA TERRITORY.

PROSPECTOR'S PAN.

SPECIFICATION forming part of Letters Patent No. 760,691, dated May 24, 1904.

Application filed April 9, 1903. Serial No. 151,782. (No model.)

*To all whom it may concern:*

Be it known that I, BEVERLY P. HERNDON, a citizen of the United States, residing at Florence, county of Pinal, and Territory of Arizona, have invented certain new and useful Improvements in Prospectors' Pans, of which the following is a specification.

My invention relates to prospectors' pans.

The object of the present invention is the provision of a prospector's pan which on account of its improved and novel form will be adapted to be conveniently carried in the pocket when not in use, will not tip over when on the ground, use a minimum quantity of water when in use, is adapted for roasting ores, will not become easily dented or injured, and which will be easy to manipulate and adapted to readily and satisfactorily separate the precious materials from the pulp.

The invention is set forth fully hereinafter and its novel features embodied in the appended claims.

Figure 1:
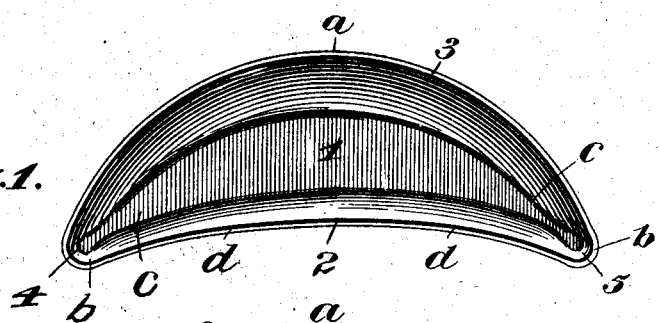
Figure 2:
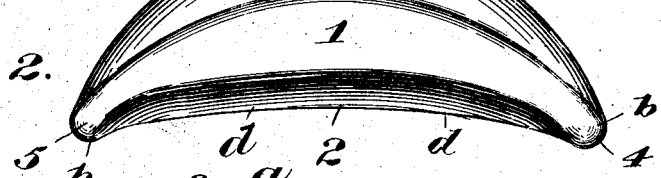
Figure 3:
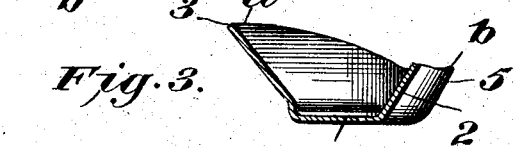
Figure 4:
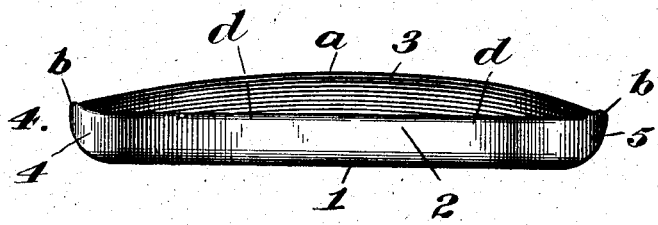
Figure 5:
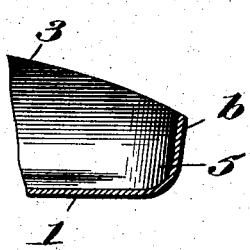

In the accompanying drawings, Figure 1 is a top plan view; Fig. 2, a bottom plan view; Fig. 3, a transverse section; Fig. 4, a side elevation, and Fig. 5 an enlarged detail of one of the corners or horns of the pan.

The pan will by preference be of sheet-iron or untempered sheet-steel and when used by quartz or vein miners of about eight or nine inches in length, while for placer prospectors it will be from twelve to sixteen inches long.

The general shape of the pan is that of a lune, having a flat bottom 1, a comparatively low somewhat curved wall 2, which flares or inclines outwardly at a small angle to the bottom 1, and a relatively high wall 3, flared outwardly or inclined relatively at an angle of about forty-five degrees, more or less, to the bottom 1 and in its general contour struck on an arc considerably more pronounced than the arc or curve of the wall 2. The ends or horns 4 and 5 of the pan are pocketed or made abrupt, as more clearly shown in Fig. 5.

The flat bottom 1 affords a firm and stable support for the pan when it is set down, so that tipping over, with incident spilling of the contents or pulp, is prevented, while the lune shape renders carrying of the pan in the pocket convenient and gives the desired results in use with a minimum quantity of water. The pan is intended to make test of ores, gravels, and sands in gulches and creeks or bars for placer-gold deposits. It can also be used in mills and concentrating plants to test the tailings wasting from the ores to ascertain if amalgam or minerals are passing off with the tailings. If desired, ore can be ground and placed in the pan and roasted over a fire, thus evaporating sulfur and pyrite ores, leaving the gold free, so it can be detected by the eye.

In using the pan it is held by the two hands at the points $b$ and the water and ground rock or gravel is wasted out at the point $a$. When nearly all the ground rock is wasted, the remaining heavy rock, iron, lead, or other metal is wasted with less water at either of the points $b$, (the horns 4 and 5,) the pan being held at the point $d$. The heavy rock or coarser particles leave first, then the iron, lead, and silver, being nearly of the same weight, pass out, leaving the free gold in the pan at the points $c$. Herein is the advantage of having the horns 4 and 5 "pocketed" or abrupt, as they retain the heavy metals until by manipulation the operator desires them to pass from the pan. In using the pan it is worked in a tilted position either toward or away from the operator.

The peculiar lune shape of the pan renders it easy to carry in the pocket and prevents denting or bending from hard usage.

Having thus described my invention, what I claim as new, and desire to secure by Letters Patent, is—

1. A portable prospector's pan having a bottom and side walls, said side walls being curved transversely or laterally in relation to the bottom and the pan being of substantial lune shape in general contour.

2. A prospector's pan having walls provided with pocketed open corners.

3. A prospector's pan of lune shape having pocketed open horns.

4. A prospector's pan of lune shape having a flat bottom, a curved and flared high wall, a low wall, and pocketed horns.

In testimony whereof I hereunto affix my signature in presence of two witnesses.

BEVERLY P. HERNDON.

Witnesses:
 JOHN C. HARRIS,
 ALBERT F. BARKER.